W. DONALDSON.
HACK SAW FRAME.
APPLICATION FILED JULY 22, 1921.
1,429,195.
Patented Sept. 12, 1922.
2 SHEETS—SHEET 1.
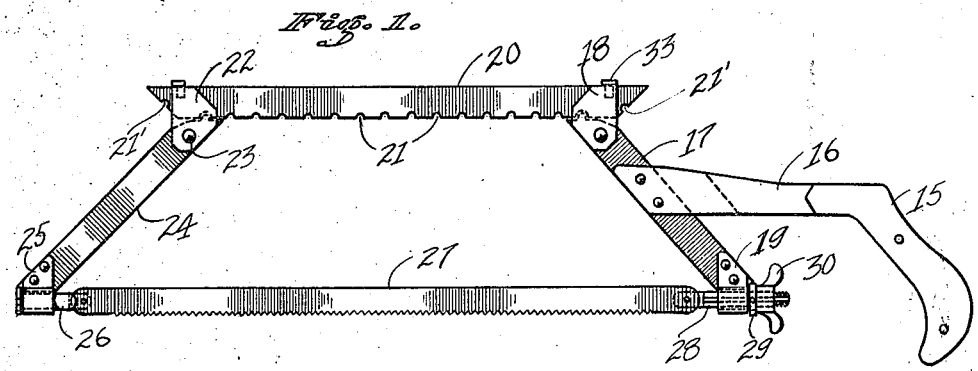
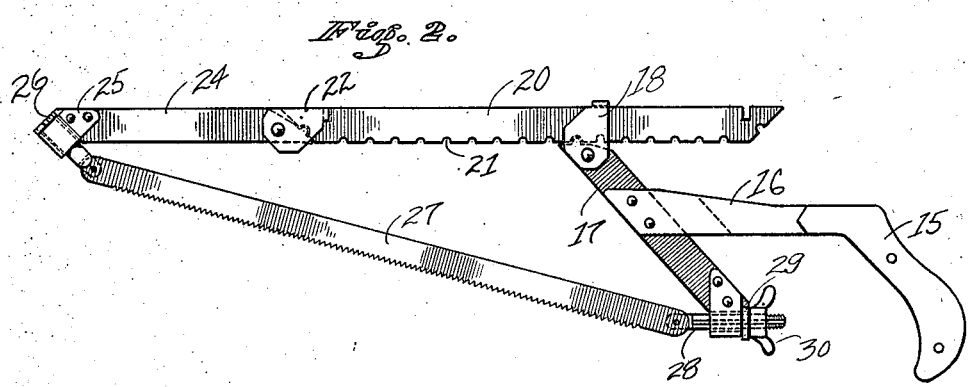
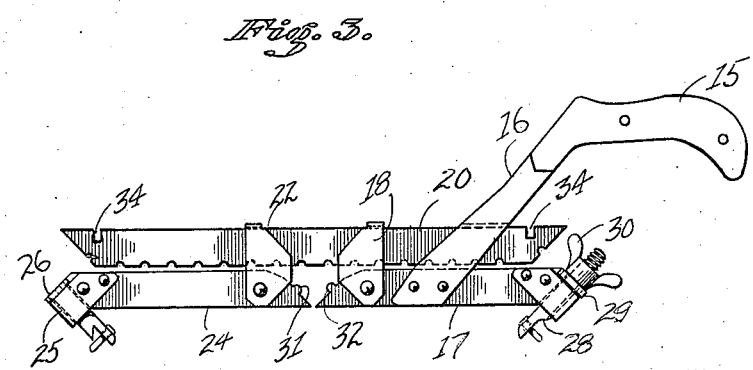
INVENTOR.
WILLIAM DONALDSON
BY Victor J. Evans
ATTORNEY.

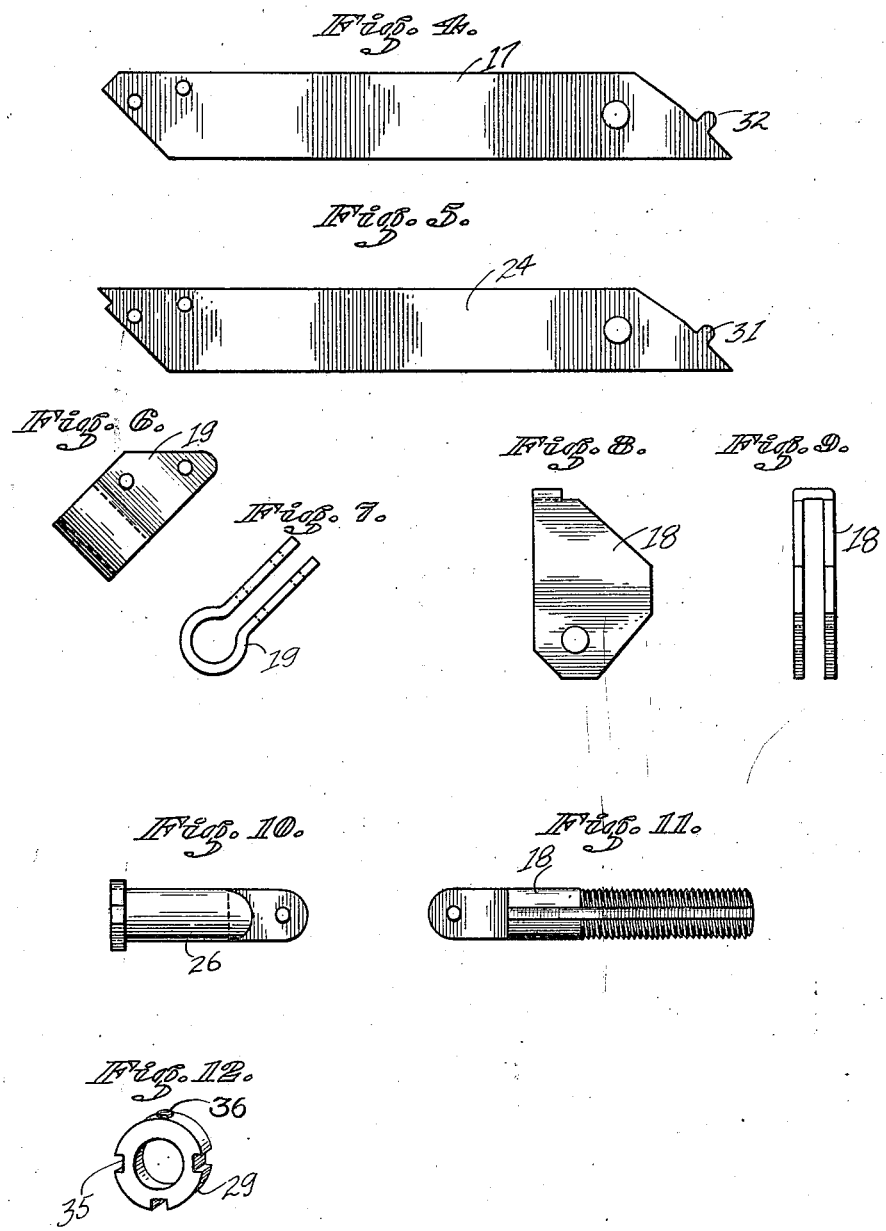

Patented Sept. 12, 1922.

1,429,195

UNITED STATES PATENT OFFICE.

WILLIAM DONALDSON, OF TACOMA, WASHINGTON.

HACK-SAW FRAME.

Application filed July 22, 1921. Serial No. 486,865.

*To all whom it may concern:*

Be it known that I, WILLIAM DONALDSON, a citizen of the United States, residing at Tacoma, in the county of Pierce and State of Washington, have invented new and useful Improvements in Hack-Saw Frames, of which the following is a specification.

This invention relates to hack saw frames, and has for its primary object the provision of a saw frame of an adjustable and collapsible type wherein new blades of different lengths can be readily substituted for old ones.

Another object of this invention is to provide a saw frame of the character described which can readily be used in restricted places and which carries a saw blade adapted to be conveniently used in several sawing positions.

A further object of this invention is to provide a saw frame of the character described which by the compact arrangement of its parts will hold the saw blade used under tension and thus avoid the binding of the parts of the frame as has been experienced heretofore.

A still further object of this invention is to provide a hack saw frame that is simple in construction, economical to manufacture, and strong and durable.

Other objects and advantages will be apparent during the course of the following description.

In the accompanying drawings forming a part of this specification and in which like numerals are employed to designate like parts throughout the same, Fig. 1 is a side elevation of a hack saw frame, showing the saw blade in normal position, Fig. 2 is a similar view showing the saw blade in an angular position, Fig. 3 is a side elevation of the hack saw frame in a collapsible position, with the saw blade removed therefrom, Fig. 4 is a detail view of one of the side supporting arms, Fig. 5 is a similar view of a second supporting arm, Fig. 6 is a detail perspective view of a split sleeve, forming part of my invention, Fig. 7 is an end view of the same, Fig. 8 is an elevation of an angular keeper plate or guard forming a part of my invention, Fig. 9 is an end view of the same, Fig. 10 is a side elevation of a pin that has pivotally secured thereto one end of the saw blade, Fig. 11 is a side elevation of a threaded bolt which supports the other end of the saw blade, and Fig. 12 is a perspective view of a locking ring forming a part of my invention.

In the drawings wherein for the purpose of illustration is shown a preferred embodiment of my invention, the numeral 15 designates a handle of the device which has secured thereto a bifurcated extension 16. To this extension there is either cast as an integral part therewith or riveted a supporting arm 17 which in turn has secured to its upper extremity a loop 18, while secured to the lower extremity of the arm 17 is a split sleeve 19. The construction of the sleeve 19 is shown to advantage in detail in Figures 6 and 7, while that of the loop member is set forth to advantage in Figures 8 and 9.

Adapted to be received for longitudinal sliding movement in the loop member 18 is one extremity of a back frame or bar 20 which has formed in one longitudinal edge thereof a plurality of equally spaced notches 21. The respective ends of the bar 20 are angular shaped and have formed therein side notches 21' the purpose of which will be hereinafter fully explained. Adjacent the opposite extremity of the back frame 20 to that on which the loop member 18 is positioned, is a second loop member 22 which has its sides embracing the end of the bar 20 and then riveted as at 23 to the upper extremity of a second supporting arm 24. To the lower extremity of the second supporting arm 24 I have provided a split sleeve 25 adapted to be penetrated by a connecting pin 26. To this pin 26 I propose to suitably and pivotally attach one extremity of a saw blade designated by the numeral 27. The other extremity of the saw blade is in turn pivotally connected to a threaded longitudinally grooved bolt 28 which has mounted thereon a binding ring 29 and a winged nut 30.

In Figure 1 the saw blade is set forth in its normal position with relation to the bar 20. In Figure 2 the saw is disposed in an angular position for cutting in restricted places, while in Figure 3 the position is set forth that the saw frame assumes when the structure is collapsed and the saw blade removed. It will be readily apparent that by the interchanging of the respective parts that the saw frame can assume the various positions as illustrated in Figures, 1, 2, and 3, for instance, when the frame is to be changed from its normal position as in Fig. 1 the bar 20 is moved longitudinally through the loop 18 and the lug 32 provided adjacent the end of the arm 17 is received in one of the notches 21. By the longitudinal movement of the bar 20 through the loop 18 the arm 24 will assume the position shown to advantage in Figure 2, and the lug 31 positioned adjacent the end of the arm 24 will be received in the end notch 22', while this lug in conjunction with the loop 18 will serve to retain the arm 24 in the same plane as the bar 20 and accordingly, the sleeve 25 will assume an angular position and thus hold the saw blade 27 in an angular cutting position.

As the tension of the parts are adjusted due to the actuation of the bolt on the winged nut, it will be obvious that the lug 32 formed on the end of arm 17 will ride in the notches 21, until it is finally retained in one notch of said frame.

For the purpose of retaining the bar 20 in a plane parallel to the saw 27 when the normal position of the hack saw is desired, dowel pins 33 are adapted to penetrate the loop 18 and 22 and to be received in slots 34 provided on the rear edge of the bar 20.

In Figure 12 I have shown to advantage the ring 29 which I intend to interpose between the sleeve 19 and the winged nut 30. This ring is provided with peripheral notches 35 in which is received one end of the arm 17, while a small threaded screw 36 is adapted to extend through the ring and be received in the groove of the threaded bolt.

From a consideration of the above description taken with the accompanying drawing it will be obvious that the frame can be conveniently adjusted to accommodate a saw blade adapted to be used in several cutting positions and furthermore, that the frame can be readily collapsed for storing and that a new blade can be easily substituted for an old one that has become broken or worn.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

A saw frame including a pair of supporting arms, one of said arms having a handle secured thereto, a loop member secured to each of said arms, a bar longitudinally movable through one of said loop members, said bar having notches in one of its longitudinal edges and recesses in its opposite edge at points near its extremities, said bar terminating in angular extremities provided with notches therein for limiting the angular motion of the arm when arranged in line with the bar, lugs on said arms adapted to be selectively received in the notches of said bar for limiting the longitudinal movement of either of said arms along said bar, and a saw blade detachably secured to said supporting arms and capable of assuming an angular position when the bar and one arm are locked in alignment one with the other.

In testimony whereof I affix my signature.

WILLIAM DONALDSON.